PINCUSHION CORRECTION CIRCUIT HAVING SATURABLE REACTOR WITH ASYMMETRICAL PARABOLIC WAVEFORM APPLIED TO THE CONTROL WINDING
Filed Aug. 31, 1964
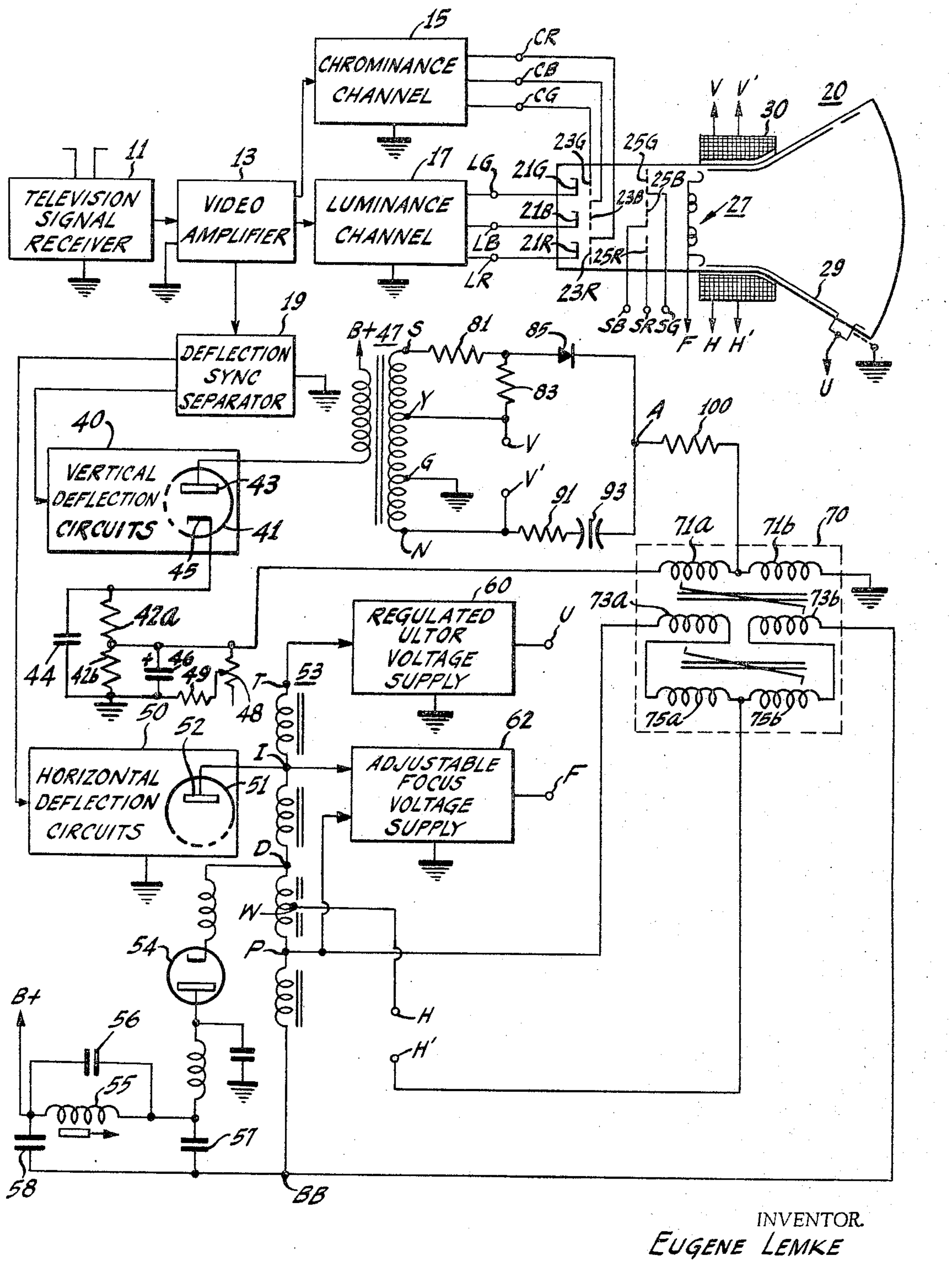
INVENTOR.
EUGENE LEMKE
BY William H. Meagher
Attorney United States Patent Office
3,329,862
Patented July 4, 1967

3,329,862

PINCUSHION CORRECTION CIRCUIT HAVING SATURABLE REACTOR WITH ASYMMETRICAL PARABOLIC WAVEFORM APPLIED TO THE CONTROL WINDING

Eugene Lemke, Indianapolis, Ind., assignor to Radio Corporation of America, a corporation of Delaware Filed Aug. 31, 1964, Ser. No. 393,294
10 Claims. (Cl. 315—27)

The present invention relates generally to circuits for effecting correction of undesired distortions of the scanning raster of a cathode ray tube; in particular, circuitry in accordance with the present invention may be employed to advantage in correcting raster distortion of the so-called "pincushion" type, as encountered, for example, in the operation of wide-angle, multi-gun color kinescopes.

The tri-gun, shadow mask color kinescope has met with wide acceptance as a satisfactory color image reproducing device in color television receivers. The RCA CTC–15 color television receiver, described in the RCA Service Data Pamphlet designated 1963 No. T6 employs such a color image reproducing device; however, the deflection angle associated with the operation of this device in the CTC–15 receiver is relatively narrow (i.e., approximately 70°) when compared with the relatively wide deflection angles (i.e., from 90° to 114°) employed in many monochrome television receivers. In development of relatively wide-angle (e.g., 90°) tri-gun color kinescopes, the many stringent requirements imposed on the deflection yoke design due to the multi-gun character of the reproducing device necessitate yoke specifications that result in development of a scanning raster suffering from a distortion generally referred to as "pincushion." Such distortion is characterized by the width of the raster varying from top to bottom, with minimum width at the picture middle and maximum width at both top and bottom, as well as variable raster height from side to side, with maximum height at left and right edges and minimum height at the picture center.

For examples of prior art solutions to the problem of pincushion raster correction, attention is directed to U.S. Patent No. 2,649,555, issued to R. K. Lockhart on Aug. 18, 1953; to U.S. Patent No. 2,682,012, issued to R. K. Lockhart on June 22, 1954; to U.S. Patent 2,700,742, issued to A. W. Friend on Jan. 25, 1955; and to U.S. Patent 2,842,709, issued to P. M. Lufkin on July 8, 1958. In general, the approach exemplified in these prior art patents involves introduction into the deflection circuit associated with beam deflection of a given frequency of a component which varies as a function of the other reflection frequency. Thus, for example, side pincushioning correction involves introduction of a vertical rate variation into the horizontal deflection circuit.

In a co-pending application of Wm. H. Barkow and R. M. Christensen Ser. No. 393,249, filed concurrently herewith, a novel and simplified approach to side pincushioning correction is described wherein saturable reactor apparatus is associated with the energization of the line deflection windings of a deflection yoke. By energization of the control winding of the saturable reactor apparatus with an appropriate vertical rate waveform, the saturable reactor apparatus effectively functions as a constant load, dynamic width control in such manner as to provide a vertical rate, parabolic variation in horizontal scan current (introducing maximum scan current reduction at the top and bottom of the raster, and minimum scan current reduction in the middle of the raster) to produce a corrected display raster with essentially straight sides.

The present invention is directed to relatively simple and inexpensive circuitry suitable for generation of a driving waveform for the control winding of such saturable reactor apparatus, whereby the desired parabolic variation of scan current magnitude may be achieved for the indicated raster correction purposes. In accordance with a preferred embodiment of the present invention, a composite voltage waveform is derived for control winding application via two paths. One path serves essentially to supply a bottom-of-the-picture component for the composite waveform, while the other path essentially provides a top-of-the-picture component for the composite waveform. The highly inductive control winding of the saturable reactor apparatus is traversed by a current corresponding to the integral of the applied composite voltage waveform, and this integral is provided with a waveshape appropriate to the development of the desired parabolic variation of scan current magnitude.

It has been observed that, due to certain inherent delays in the functioning of saturable reactor apparatus, for production of a properly symmetrical parabolic scan current variation (i.e., with the trough of the parabola occurring during each middle-of-the-picture interval), it is appropriate to provide a control winding current that is, while of generally parabolic waveshape, slightly asymmetrical in that the trough thereof occurs "earlier" than the precise middle-of-the-picture.

In a particular circuit arrangement in accordance with the present invention, the desired asymmetrical but generally parabolic control winding current is realized through use of the above-mentioned two-path composite voltage waveform developing arrangement, with one path incorporating a clipping device and operating upon a first polarity version of a vertical deflection output voltage waveform to develop an end-of-scan sawtooth voltage component rising to a maximum magnitude at the bottom of the picture, and with the other path operating upon an opposite polarity, attenuated amplitude version of the same vertical deflection output voltage waveform to provide a somewhat flattened and delayed retrace pulse component occupying a beginning-of-scan interval; the energy content and waveshapes of the two described voltage components are so related that integration of the composite of these two voltage components results in traversal of the control winding by the desired asymmetrical parabolic current.

A primary object of the present invention, accordingly, is the provision of novel and improved circuitry for effecting raster distortion correction.

A further particular object of the present invention is to provide novel and improved circuitry for the generation of a driving waveform for pincushion correction apparatus of a saturable reactor type.

Other objects and advantages of the present invention will be readily recognized by those skilled in the art upon a reading of the following detailed description and an inspection of the accompanying drawing which illustrates, in combined block and schematic form, color television receiver apparatus including pincushion correction circuitry incorporating an embodiment of the present invention.

In the drawing, a color television receiver is illustrated, which may, for example, be of the general form of the RCA CTC16 color television receiver, described in the RCA Color Television Service Data pamphlet designated 1964 No. T6. Block representations of a number of major segments of the receiver are employed for the purpose of simplifying the drawing; however, pertinent portions of the receiver's deflection circuitry, together with pincushion correction circuitry in accordance with an embodiment of the present invention, are illustrated in schematic detail.

The receiver input segment, represented by the block 11, labeled television signal receiver, selects a radiated color television signal, converts the selected modulated RF signal to intermediate frequencies, amplifies the resultant modulated IF signal, and, by detection of the IF signal, recovers a composite color video signal; i.e., it may comprise the usual lineup of tuner, IF amplifier and video detector. The composite color video signal output of receiver 11 is supplied to a video amplifier 13, from which is derived inputs for the receiver's chrominance channel 15, luminance channel 17, and deflection sync separator 19.

The chrominance channel 15, shown only in block form, may comprise the usual circuitry associated with proper recovery of color-difference signal information from the modulated color subcarrier which is a component of the composite color video signal output of video amplifier 13. Such circuitry generally comprises a bandpass amplifier for selectively amplifying the color subcarrier and its sidebands, a suitable array of synchronous detectors for demodulating the color subcarrier and matrix circuits for suitably combining the detector outputs to obtain a set of color-difference signals of the appropriate form for application to the receiver's color image reproducer. To effect the desired synchronous detection of the color subcarrier, there will be associated with the chrominance channel detectors a local source of oscillations of subcarrier frequency and reference phase, as well as means for phase synchronizing this local oscillation source in accordance with the reference information of the burst component of the composite color video signal.

The red, blue and green color-difference signal outputs of the chrominance channel 15 appear at respective output terminals CR, CB and CG, which are directly connected to the respective control grids, 23R, 23B and 23G, of the red, blue and green electron guns of a color kinescope 20, which is of the well-known tri-gun, shadow-mask type.

This color-difference signal drive of color kinescope 20 is complemented by the application of luminance information to the respective cathodes 21R, 21B and 21G of color kinescope 20. Luminance channel 17, which may, in its usual form, comprise suitable wideband amplifier means for amplifying the luminance signal component of the composite color video signal processed by video amplifier 13, develops luminance signal outputs at respective output terminals LR, LB and LG for direct application to the respective kinescope cathodes 21R, 21B and 21G. Desirably, the luminance channel 17 may include means for adjusting the relative amplitudes of the luminance signal outputs appearing at the respective output terminals, for color balance purposes.

The color kinescope 20 additionally includes: individual screen grid electrodes 25R, 25B and 25G for the respective red, blue and green electron guns, each screen grid electrode being supplied with an operating D.C. potential (desirably individually adjustable) at the appropriate one of the energizing terminals SR, SB and SG; focusing electrode structure 27 for the electron gun trio, subject to common energization via the output terminal F of an adjustable D.C. source to be described subsequently; and ultor (final accelerating) electrode structure 29, adapted to operate at a high voltage, supplied thereto via the output terminal U of a high voltage supply, also to be subsequently described.

Associated with the color kinescope 20 is a deflection yoke 30 for developing magnetic beam deflection fields within the kinescope to cause the kinescope beams to trace a scanning raster on the kinescope's viewing screen. The deflection yoke 30 incorporates respective horizontal and vertical deflection windings, which, upon energization with deflection currents of appropriate frequencies and waveshapes, will provide the respective line and field rate deflections of the kinescope beams desired for raster development. The horizontal deflection windings of yoke 30 are connected between terminals H and H′ in the receiver's horizontal deflection circuitry, while the vertical deflection windings of yoke 30 are connected between terminals V and V′ in the receiver's vertical deflection circuitry. To appreciate the manner in which the yoke windings are energized via the noted terminals, a detailed consideration of certain portions of the deflection circuitry is now in order.

The deflection sync separator 19, in response to an output of video amplifier 13, separates the deflection synchronizing components from the remainder of the received composite color video signal. The sync separator 19 supplies a vertical sync pulse output to the vertical deflection circuits 40, and a horizontal sync pulse output to the horizontal deflection circuits 50. No attempt has been made to illustrate in complete schematic detail all of the elements of the vertical and horizontal deflection circuits; rather, block representations have been employed, with only a partial schematic showing of the output or driving device for each of the circuits. However, schematic details of the output circuit elements associated with said driving devices, which elements serve in the actual transfer of energy between the respective driving devices and the respective yoke windings, have been shown, since the instant invention is directly associated with these elements.

The partially illustrated driving device of the vertical deflection circuits 40 is the vertical output tube 41. The output tube 41 includes an anode electrode 43, connected to a source of anode potential, provided by the receiver's B+ supply (not illustrated), via the primary winding of a vertical output transformer 47. The output tube 41 additionally includes a cathode electrode 45, which is returned to a point of reference potential (e.g. chassis ground) by means of the series combination of a pair of cathode resistors **42*a* and 42*b*, the series combination being shunted by a bypass capacitor 49. For adjustable bias source purposes to be described subsequently, cathode resistor 42*b* is shunted by a filter capacitor 46 paralleled by the series combination of variable resistor 48 and fixed resistor 49**.

The secondary winding of the vertical output transformer 47 has respective end terminals S and N; the secondary winding also is provided with a pair of taps Y and G, positioned intermediate the end terminals S and N. The tap G is located on the secondary winding at a point between the end teminal N and the additional tap Y, and is directly connected to chassis ground.

Terminals V, V′ are directly connected to the tap Y and end terminal N, respectively, of the transformer 47 secondary. Thus, the vertical deflection windings of yoke 30 are shunted across the Y–N segment of the transformer secondary, and are thereby energized, in a push-pull manner, with an appropriate field rate deflection current waveform. By suitable energization of the output tube 41, the waveform of the current thus caused to flow through the vertical yoke windings may be of the conventionally desired sawtooth shape, repeating at a field rate in appropriate phase synchronism with the field rate delivery of video information to the display device 20.

The partially illustrated driving device of the horizontal deflection circuits 50 is the horizontal output tube 51. The output tube 51 includes an anode electrode 52, which is directly connected to an input terminal I of the horizontal output transformer 53. In accordance with conventional practice, the windings of the horizontal output transformer 53 are arranged to provide (a) step-down autotransformer coupling between the output tube 51 and the windings of yoke 30 through which line deflection currents are to be passed; and (b) step-up autotransformer coupling between the output tube 51 and pulse rectification circuitry serving to develop the high voltage required by the kinescope ultor electrode structure 29.

The winding segment of transformer 53 which extends between input terminal I and the end terminal BB serves as the primary winding for the step-down autotransformer drive of the yoke 30. The I–BB winding segment is provided with an intermediate tap W. The transformer 53 winding segment extending between tap W and end terminal BB serves as the step-down autotransformer secondary; that is, the horizontal deflection windings of yoke 30 are coupled across the W–BB transformer segment. More specifically, the horizontal deflection windings of yoke 30 are connected between terminals H and H′, terminal H being directly connected to the transformer tap W, and terminal H′ being connected via a segment of an apparatus 70 (to be subsequently described) to the end terminal BB.

Also coupled across a segment of transformer 53 is damper circuitry of well-known function. The damper circuitry includes a damper diode 54, the cathode of which is coupled (via an RF choke) to a tap D positioned on the transformer 53 winding between input terminal I and the yoke connection tap W. The anode of damper diode 54 is connected (via an additional RF choke) to one end terminal of a variable inductance 55, which serves as a linearity or efficiency control; the other end terminal of the variable inductance 55 is connected to the receiver's B+ supply. The variable inductance 55 is shunted by a capacitor 56. A pair of capacitors, 57 and 58, are coupled between respective end terminals of variable inductance 55 and the end terminal BB of transformer 53. In accordance with well-known power recovery principles which need not be detailed here, the period conduction of damper diode 54 develops a charge on capacitors 57 and 58, which effectively adds to the B+ potential, resulting in development of the so-called B-boost voltage at terminal BB.

In addition to the winding segments heretofore discussed, transformer 53 also includes a winding segment extending from its remaining end terminal T to the input terminal I. An input for a regulated ultor voltage supply 60 is derived from end terminal T. The supply 60 serves to rectify recurring flyback voltage pulses developed in the transformer 53 during retrace intervals; the flyback pulses appearing at terminal T have an augmented amplitude due to the previously mentioned step-up autotransformer action, whereby the DC output at supply output terminal U is of the high level required for energization of the ultor electrode structure 29. Desirably, the supply 60 incorporates means for regulating the voltage output so that the ultor voltage remains relatively constant despite variations in load.

An additional kinescope electrode voltage supply operates in association with the transformer 53; viz, the adjustable focus voltage supply 62, which develops an adjustable DC voltage at its output terminal F for application to the focusing electrode structure 27. An advantageous form which the supply 62 may take is that shown in U.S. Patent No. 3,113,237, issued to J. C. Schopp and L. E. Annus on Dec. 3, 1963. In operation of the focus voltage supply therein described, two flyback pulse inputs are utilized by the supply, one of relatively high voltage level and one of relatively low voltage level. In the circuit of the drawing herein, a high level flyback pulse input for supply 62 is shown as being derived via a connection to the input terminal I of transformer 53, while a low level pulse input for supply 62 is derived via a connection to the tap P, positioned on the transformer windings at a point intermediate the tapping point W and the end terminal BB.

The description to this point is characteristic of prior art receivers such as the previously mentioned CTC16. The present invention, however, is concerned with the performance of an additional function, viz, pincushion correction, a function absent from such prior art receivers. As previously noted, where deflection angles of the order of 70° are employed, it has been found to be feasible, through appropriate yoke design, to keep raster distortions such as pincushion to a minimum whereby dynamic correction thereof was not needed. However, where wider deflection angles, such as 90°, are to be used, practical limitations on yoke design result in conditions where dynamic pincushion correction appears to be a necessity. Apparatus 70 in the circuit of the drawing serves the function of providing dynamic correction of a side pincushion raster distortion.

In a co-pending application of W. H. Barkow and R. M. Christensen, entitled "Circuit Arrangement" and filed concurrently herewith, a detailed explanation is presented of the apparatus 70, its operating principles and the manner in which it achieves the desired side pincushion correction. Apparatus 70 may be generally characterized as saturable reactor apparatus employed as a constant load, dynamic width control. It is not believed to be necessary for an understanding of the present invention to present herein a full explanation of the magnetic structure of the saturable reactor apparatus, which preferably takes a four-window core form; reference may be made to the aforementioned co-pending Barkow and Christensen for such an explanation, if desired. It should be sufficient to note here that in its operation, three distinct windings of the device are employed, with current flowing through a first "control" winding serving to vary in a differential manner the reactive impedances presented by the second and third windings to the respective currents flowing therethrough.

In the circuit of the drawing, the control winding comprises two winding segments designated 71*a* and 71*b*, respectively. A second winding of the saturable reactor apparatus comprises winding segments 73*a* and 75*a*, while a third winding of the saturable reactor apparatus comprises winding segments 73*b* and 75*b*. Bias current flowing through the control winding 71*a* and 71*b* establishes a desired magnetic biasing point for the magnetic structure associated with each of the second and third windings. Passage of a field rate current through the control winding effects mutually opposite field rate variations in the reactive impedances presented by the second and third windings. These mutually opposite impedance variations are used to effect side pincushion correction by suitable disposition of the second and third windings in the horizontal deflection circuit; to achieve a constant load effect, the disposition is such that the opposite variations in the respective reactive impedances cause opposite effects on the loading of transformer 53, though achieving similar direction effects on the current flowing through the horizontal yoke windings.

In order that the foregoing may be more readily understood, it is in order to describe the specific connections of the saturable reactor windings in the horizontal deflection circuitry. It will be seen that the winding 73*b*, 75*b* is connected between the horizontal yoke winding terminal H′ and the transformer end terminal BB. The winding 73*a*, 75*a* is connected between the transformer tap P and the yoke winding terminal H′. Winding 73*b*, 75*b* displays a reactive impedance that is variable over a first range; the reactive impedance of winding 73*a*, 75*a* is variable over a second range, desirably of a significantly higher level than the first range.

It will be seen that winding 73*b*, 75*b* is in series with the horizontal yoke winding across the driving source constituted by the step-down transformer secondary (i.e., the W–BB winding segment). That is, the winding 73*b*, 75*b* is serially connected in the return path for the current traversing the horizontal yoke windings. Thus, it will be seen that changes in the impedance of winding 73*b*, 75*b* will affect the amplitude of the current flowing through the horizontal yoke windings inversely; i.e., an increase in the impedance of winding 73*b*, 75*b* causes a decrease in the horizontal yoke winding current, and vice versa.

On the other hand, changes in the impedance of winding 73*a*, 75*a* will cause variations in the amplitude of current flowing through the horizontal yoke winding of a corresponding polarity; i.e., an increase in the impedance of winding 73a, 75a will cause an increase in the horizontal yoke winding current. This is due to the fact that the winding 73a, 75a is effectively in shunt with the horizontal yoke winding. More accurately, winding 73a, 75a is shunted across a portion of the current source represented by the W–BB segment of transformer 53; specifically, the source portion is constituted by the P–BB transformer winding segment. It will be noted that winding 73a, 75a is not directly returned to the low potential terminal BB; rather, it is returned thereto via the winding 73b, 75b. However, with the impedance range for the winding 73a, 75a chosen to be significantly greater than the impedance range of the windings 73b, 75b, the impedance in the path shunting the P–BB transformer segment is mainly determined by the instantaneous value of the windings 73a, 75a.

The overall effect of differential variations in the impedances of the respective windings 73a, 75a and 73b, 75b may now be appreciated. When for example, the impedance of windings 73a, 75a is increased, accompanied by a decrease in the impedance of windings 73b, 75b, the result is as follows: the decrease of impedance in series with the yoke winding tends to cause an increase in the yoke winding current; the attendant net increase in the impedace of the current path shunted across the P–BB transformer segment similarly tends to cause an increase in yoke winding current, since the current diverted through this "competing" shunt path is decreasing. However, if the relative impedance ranges of windings 73a, 75a and 73b, 75b are properly proportioned, the aforesaid increase in yoke winding current is not accompanied by a change in loading on the transformer 53, since the transformer sees a decrease in the load presented by the yoke current path accompanied by an increase in the "competing" shunt load across the P–BB transformer segment. Thus, the transformer sees the yoke winding current variations only as a transfer of current between two competing loads, the combined loading presented by the two competing loads remaining substantially constant.

The nature of side pincushion distortions generally encountered involves a vertical rate variation of line width that is essentially parabolic in character. That is, the noncorrected width of a scanning line at the viewing screen varies from a maximum at the picture top through a minimum at the picture middle and back to a maximum at the picture bottom, with the variations between these peak points following an essentially parabolic curve. This calls for a correcting vertical rate variation in yoke winding current to be essentially parabolic. Thus, the differential vertical rate variations of the impedances of windings 73a, 75a and 73b, 75b should be essentially parabolic in character.

If the current in the control winding segments 71a, 71b is varied in accordance with a vertical rate parabola, the desired impedance variations may be effected. However, it has been observed that, due to apparent time delay effects in the operation of saturable reactor apparatus, a symmetrical parabolic variation in the control winding current will not produce completely satisfactory results. The "trough" of the parabolic impedance variation will be delayed in time relative to the "trough" of the parabolic variation in control winding current. Since the side pincushion raster distortion is generally vertically symmetrical, it is desirable to have a symmetrical parabolic variation of the width controlling impedances. It has thus been determined that an asymmetrical parabolic variation of the control winding current (i.e., where the "trough" of the parabolic variation is "early"—displaced toward the time of picture top scanning and away from the time of picture bottom scanning) is desired.

The present invention is concerned with providing such asymmetrical energization of the control winding segments. The invention proposes to apply across the control winding segments a voltage of such wave shape as to produce, when integrated by the highly inductive control winding segments, the desired asymmetrical parabolic current variation. A two path arrangement is employed to supply two distinct voltage components, which, in combination, will provide the desired voltage wave shape for application across the control winding segments.

A first voltage component is developed by circuitry including a resistor 81 and a diode 85 connected in series between end terminal S of the vertical output transformer 47 and a voltage component adding point A. The junction of resistor 81 and diode 85 is connected to tapping point Y on the output transformer 47 via a resistor 83. The adding point A is connected to the junction of the control winding segments 71a and 71b by means of a resistor 100. A second voltage component is developed for application to the control winding by circuitry including a resistor 91 and a capacitor 93 connected in series between end terminal N of output transformer 47 and the adding point A.

In the particular circuit arrangement of the drawing, the poling of diode 85 is such that its cathode is directly connected to adding point A, and its anode to the junction of resistors 81 and 83. For such diode poling, the poling of the windings of transformer 47 should be such as to cause the scanning voltage waveform (comprising a sawtooth component rising to a peak in one direction, and a retrace pulse component peaking in the opposite direction) at end terminal S to be of a polarity such that the retrace pulse component is negative-going. In other words, the poling of diode 85 and the windings of transformer 47 should be so related that diode 85 blocks the retrace pulse component of the waveform at terminal S.

The diode path to adding point A accordingly serves a clipping function. Diode 85 will be non-conducting during the retrace interval and a portion of the beginning-of-trace interval, but will conduct during an end-of-trace interval. Thus, the voltage component developed at adding point A through the clipping action of diode 85 will essentially consist of a positive-going sawtooth voltage, occupying an end-of-trace interval. Added to this voltage component at point A will be a voltage waveform contributed by the resistor 91—capacitor 93 path. The voltage waveform appearing at end terminl N of output transformer 47 will be a relatively attenuated, opposite-polarity version of the waveform developed at the end terminal S. Thus, it will comprise a positive-going retrace pulse, together with a negative-going sawtooth component of reduced amplitude relative to the amplitude of the positive-going sawtooth component clipped by diode 85. The relative amplitudes will be determined by the location of the grounded transformer tap G (that is, in accordance with turns ratio between the N–G and S–G transformer winding sections). Resistor 91 and capacitor 93 serve to shape and delay this waveform in application to adding point A.

As a result of the above-described voltage component contributions, the composite voltage waveform developed at adding point A essentially consists of a somewhat delayed and flattened positive-going retrace pulse, occupying a relatively narrow beginning-of-trace interval, and a positive-going sawtooth component, occupying a relatively wide end-of-trace interval. With proper turns ratio choice, the delayed retrace pulse component will have a peak amplitude of the order of, though slightly greater than, the peak amplitude of the positive-going clipped sawtooth component; with such a turns ratio choice, the effect of the negative-going sawtooth contributed by the resistor 91-capacitor 93 path will be relatively insignificant (effectively only serving to lessen, to a small degree, the amplitude of the positive-going sawtooth component passed by diode 85).

The current through control winding segments 71a and 71b has a wave shape that is an integrated version of the driving voltage waveform at adding point A. The energy distribution in the compositive voltage waveform is such that integration thereof provides the desired asymmetrical parabola (i.e., a parabola with the desired "early" trough).

It will be noted that, by virtue of the connection of adding point A (via resistor 100) to the junction of control winding segments 71*a* and 71*b*, the connection of the opposite end of segment 71*b* directly to chassis ground, and the connection of the opposite end of the segment 71*a* (via the output tube cathode resistor 48) to chassis ground, the driving voltage waveform is applied across the control winding segments 71*a* and 71*b* in parallel. On the other hand, for bias current purposes, the control winding segments 71*a* and 71*b* are effectively connected in series; the aforementioned cathode resistor 42*b* (shunted by filter capacitor 46) serves as the bias voltage source producing this bias current, in the illustrated circuit arrangement. It should be recognized that driving circuits in accordance with the present invention may be used to provide the desired control winding current in arrangements other than that illustrated in the drawings, as, for example, where it may be desired to drive the control winding segments in series rather than in parallel. It should also be recognized that the principles of the present invention may be used to advantage in pincushion correction arrangements of simpler form than that specifically shown; e.g., where maintenance of constant loading is not of great concern, a single controlled winding, in series or in shunt relationship to the horizontal yoke winding, may be used alone to provide the desired dynamic width correction, with driving circuitry pursuant to the present invention associated with the control winding to produce the requisite control winding current.

Various simplifying modifications may be made with regard to the specifically illustrated drive circuit embodiment. For example, in the circuit shown, resistors 81 and 83 form a voltage divider across the S–Y segment of the vertical output transformer 47. Choice of the relative magnitudes of these resistors enables selection of the precisely appropriate amplitude for the scanning voltage waveform input to the clipping diode 85 for any particular correction circuit parameters. However, where this design adaptation facility is not desired, the choice of transformer winding turns may be relied upon entirely for establishment of proper diode input amplitude, and the aforesaid voltage divider dispensed with. Retention of resistor 81, even when not required for the aforementioned voltage divider purposes, appears advisable, however, for isolation, diode stabilization and driving source impedance level establishing purposes. Resistor 100 is not essential for the operation of the control winding energization circuit, but its presence serves a direct current limiting and isolating function that is advantageous in the general circuit arrangement shown; additionally, it provides a further design facility for adjusting the driving impedance to the appropriate level.

The particular biasing arrangement for reactor 70 shown in the drawing merits further explanation. For optimum operation of the pincushion correction circuitry, it is important to establish proper magnetic biasing points for the saturable reactor 70; in the apparatus shown, the biasing is done electromagnetically (i.e., by passing direct current through the control winding 71*a*, 71*b*). It is desirable that the bias voltage source causing such bias current flow be a stable D.C. voltage source. In accordance with an aspect of the present invention, elements in the cathode circuit of the vertical output tube 41 are employed as such a bias voltage source. Bias voltage stability is of a high order with such a source location, particularly if the vertical output stage is of a stabilized form such as is employed in the aforementioned CTC15 and CTC16 receivers (where circuitry inclusive of a voltage dependent resistor responds to any changes in the vertical retrace pulse amplitude to provide a compensating change in the bias of the vertical output tube).

In the specific bias circuit of the drawing, the D.C. voltage developed at output tube cathode 45 due to space current flow in the cathode circuit is divided down (by the voltage divider formed by resistors 42*a* and 42*b*) to a level suitable for control winding driving. The relatively large electrolytic capacitor 46 filters out undesired A.C. variations in the divided D.C. voltage across resistor 42*b*. The additional shunt path, comprising variable resistor 48 and fixed resistor 49 in series, permits variation in the voltage division ratio to provide a bias amplitude adjustment. The presence of fixed resistor 48 in the shunt path is for limiting purposes (i.e., to preclude complete elimination of bias current).

The primary need for a bias amplitude adjustment stems from the variation from unit to unit of reactor core reluctance due to gap tolerances. However, it has been observed that there is a reasonably wide range of acceptable magnetic biasing points; this permits use of variable resistor 48 for biasing adjustment within that range to points representing optimum impedance levels insofar as the loading on the horizontal output transformer 53 is concerned. Thus, factory adjustments of resistor 48 are preferably made on the basis of setting the impedance levels of windings 73*a*, 75*a* and 73*b*, 75*b* to provide some predetermined tolerable loading effect on transformer 53. It should be recognized that, under appropriate design circumstances, a single adjustable resistor, in place of the illustrated set of resistors (42*b*, 48 and 49), may adequately serve the desired bias adjustment purpose.

A set of values for pertinent circuit parameters of the illustrated invention embodiment, found to provide satisfactory pincushion correction, is set forth below, by way of example only:

| | | |
|---|---|---|
| Resistor **42***a* | ohms | 1500 |
| Resistor **42***b* | do | 330 |
| Resistor **48** | do | 2500 |
| Resistor **49** | do | 82 |
| Resistor **81** | do | 150 |
| Resistor **83** | do | 150 |
| Resistor **91** | do | 180 |
| Resistor **100** | do | 47 |
| Capacitor **44** | μf | .47 |
| Capacitor **46** (polarized electrolytic) | μf | 50 |
| Capacitor **93** (non-polarized electrolytic) | μf | 10 |
| Diode **85** | | 1N3754 |
| Transformer **53**: | | Turns |
| N–G segment | | 40 |
| S–G segment | | 160 |
| N–Y segment | | 140 |
| Saturable reactor **70**: | | Turns each |
| Winding segments **71***a*, **71***b* | | 1300 |
| Winding segments **73***a*, **75***a* | | 100 |
| Winding segments **73***b*, **75***b* | | 18 |

What is claimed is:

1. In combination, means for presenting a variable impedance comprising a saturable reactor including a control winding and at least one other winding, the impedance of said other winding being subject to variations in response to changes in current through said control winding;

a utilization circuit including a source of current and said other winding;

and means for causing the current through said other winding to vary in accordance with a desired periodic function, the periodic current variation being substantially symmetrical in that recurring current minimums are spaced in time from immediately preceding and succeeding current maximums by substantially equal time intervals;

said current variations causing means comprising a source of recurring voltage waveforms having a periodicity corresponding to that of said desired periodic function, and means including a coupling from said control winding to said source for varying current in said control winding in accordance with an asymmetrical version of said desired periodic function, recurring control winding current minimums being spaced in time from immediately preceding and succeeding current maximums by significantly unequal time intervals.

2. In combination, means for presenting a variable impedance comprising a saturable reactor including a control winding and at least one other winding, the impedance of said other winding being subject to variations in response to changes in current through said control winding;

a utilization circuit including a source of current and said other winding;

and means for causing the current through said other winding to vary in accordance with a desired periodic function of substantially symmetrical, parabolic form;

said current variation causing means comprising a source of recurring voltage waveforms having a periodicity corresponding to that of said desired periodic function, and means including a coupling from said control winding to said source for varying current in said control winding in accordance with an asymmetrical version of said desired periodic function, recurring control winding current minimums being spaced in time from immediately preceding and succeeding current maximums by significantly unequal time intervals.

3. In a cathode ray tube beam deflection system, the combination of:

a saturable reactor including a control winding and at least one other winding, the impedance of said other winding being subject to variations in response to changes in current through said control winding;

a line frequency deflection circuit including a source of line scanning current and said other winding;

and means for causing the current through said other winding to vary in accordance with a desired periodic function of field frequency and of substantially symmetrical, parabolic form;

said current variation causing means comprising a source of recurring field frequency voltage waveforms, and means including a coupling from said control winding to said source for varying current in said control winding in accordance with an asymmetrical version of said desired periodic function, recurring control winding current minimums being spaced in time from immediately preceding and succeeding current maximums by significantly unequal time intervals.

4. In a television receiver including a deflection yoke having respective vertical and horizontal deflection windings, the combination comprising:

a saturable reactor including a control winding and at least one other winding, the impedance of said other winding being subject to variations in response to changes in current through said control winding;

a horizontal deflection circuit including a source of horizontal scanning current energizing said horizontal deflection winding in series with said other winding;

and means for causing the horizontal scanning current in said deflection winding to vary in accordance with a desired periodic function of vertical deflection frequency and of substantially symmetrical, parabolic form;

said current variation causing means comprising a source of recurring voltage waveforms of vertical deflection frequency, and means including a coupling from said control winding to said source for varying current in said control winding in accordance with an asymmetrical version of said desired parabolic function, recurring control winding current minimums being spaced in time from immediately preceding and succeeding current maximums by significantly unequal time intervals.

5. In a television receiver including a deflection yoke having respective vertical and horizontal deflection windings, the combination comprising:

a saturable reactor including a control winding and at least one other winding, the impedance of said other winding being subject to variations in response to changes in current through said control winding;

a horizontal deflection circuit including a source of horizontal scanning current energizing said horizontal deflection winding effectively in shunt with said other winding;

and means for causing the horizontal scanning current in said deflection winding to vary in accordance with a desired periodic function of vertical deflection frequency and of substantially symmetrical, parabolic form;

said current variation causing means comprising a source of recurring voltage waveforms of vertical deflection frequency, and means including a coupling from said control winding to said source for varying current in said control winding in accordance with an asymmetrical version of said desired parabolic function, recurring control winding current minimums being spaced in tune from immediately preceding and succeeding current maximums by significantly unequal time intervals.

6. In a television receiver comprising a deflection yoke having respective vertical and horizontal deflection windings, a horizontal deflection circuit including a horizontal output transformer serving as a source of horizontal scanning current for said horizontal deflection winding, and a vertical deflection circuit including a vertical output transformer serving as a source of vertical scanning current for said vertical deflection winding; side pincushion correction apparatus comprising the combination of:

a saturable reactor including a control winding and at least one other winding, the impedance of said other winding being subject to variations in response to changes in current through said control winding;

means for connecting said other winding to said horizontal output transformer in such manner that variations in the impedance of said other winding will cause variation in the scanning current traversing said horizontal deflection winding;

means for deriving from said vertical output transformer a scanning voltage waveform of a first polarity and inclusive of a retrace pulse component;

clipping means coupled to said voltage waveform deriving means, and having an output terminal, for blocking said retrace pulse component and passing to said output terminal at least a portion of the remainder of said voltage waveform;

means for deriving from said vertical output transformer a second voltage waveform corresponding to a relatively attenuated, opposite-polarity version of said first-named scanning voltage waveform;

wave shaping and delaying means coupled to said last named deriving means for applying to said clipping means output terminal a shaped voltage output waveform inclusive of a delayed retrace pulse component;

and means for applying the composite voltage waveform appearing at said clipping means output terminal across said control winding.

7. In a television receiver comprising a deflection yoke having respective vertical and horizontal deflection windings, a horizontal deflection circuit including a horizontal output transformer serving as a source of horizontal scanning current for said horizontal deflection winding, and a vertical deflection circuit including a vertical output transformer serving as a source of vertical scanning current for said vertical deflection winding; side pincushion correction apparatus comprising the combination of:

a saturable reactor including a control winding and two other windings, the respective impedance of said other windings varying differentially in response to changes in current through said control winding;

means for connecting a first of said other windings in series in the path of the scanning current traversing necting the second of said windings effectively in shunt with said horizontal deflection winding whereby differential variations of the respective impedances of said other windings produce mutually opposing effects on the loading of said horizontal output transformer while producing mutually reinforcing effects on the amplitude of said scanning current traversing said horizontal deflection winding;

means for deriving from said vertical output transformer a scanning voltage waveform of a first polarity and inclusive of a retrace pulse component;

clipping means, coupled to said voltage waveform deriving means, and having an output terminal, for blocking said retrace pulse component and passing to said output terminal at least a portion of the remainder of said scanning voltage waveform;

means for deriving from said vertical output transformer a second voltage waveform corresponding to a relatively attenuated, opposite-polarity version of said first-named scanning voltage waveform;

wave shaping and delaying means coupled to said last named deriving means for applying to said clipping means output terminal a shaped voltage output waveform inclusive of a delayed retrace pulse component;

and means for applying the composite voltage waveform appearing at said clipping means output terminal across said control winding.

8. In a television receiver comprising a deflection yoke having respective vertical and horizontal deflection windings, a horizontal deflection circuit including a horizontal output transformer serving as a source of horizontal scanning current for said horizontal deflection winding, and a vertical deflection circuit including a vertical output transformer serving as a source of vertical scanning current for said vertical deflection winding; side pincushion correction apparatus comprising the combination of:

a saturable reactor including a control winding and two other windings, the respective impedances of said other windings varying differentially in response to changes in current through said control winding;

means for connecting a first of said other windings in series in the path of the scanning current traversing said horizontal deflection winding and for connecting the second of said other windings effectively in shunt with said horizontal deflection winding whereby differential variations of the respective impedances of said other windings produce mutually opposing effects on the loading of said horizontal output transformer while producing mutually reinforcing effects on the amplitude of said scanning current traversing said horizontal deflection winding;

means for deriving from said vertical output transformer a scanning voltage waveform of a first polarity and inclusive of (1) a periodic retrace pulse component peaking in one direction and occupying recurring retrace intervals that intervene between recurring trace intervals, and (2) a sawtooth component occupying said recurring trace intervals and reaching a peak in a direction opposite to said one direction at the end of each trace interval;

clipping means, coupled to said voltage waveform deriving means, and having an output terminal, for blocking said retrace pulse component and passing to said output terminal a portion of said sawtooth component inclusive of said peak;

means for deriving from said vertical output transformer a second voltage waveform corresponding to a relatively attenuated, opposite-polarity version of said first-named scanning voltage waveform;

wave shaping and delaying means coupled to said last named deriving means for applying to said clipping means output terminal a shaped voltage output waveform inclusive of a delayed retrace pulse component peaking in the same direction as the sawtooth component peak passed by said clipping means;

and means for applying the composite voltage waveform appearing at said clipping means output terminal across said control winding.

9. In a television receiver comprising a deflection yoke having respective vertical and horizontal deflection windings, a horizontal deflection circuit including a horizontal output transformer serving as a source of horizontal scanning current for said horizontal deflection winding, and a vertical deflection circuit including a vertical output transformer serving as a source of vertical scanning current for said vertical deflection winding; side pincushion correction apparatus comprising the combination of:

a saturable reactor including a control winding and at least one other winding, the impedance of said other winding being subject to variations in response to changes in current through said control winding;

means for connecting said other winding to said horizontal output transformer in such manner that variations in the impedance of said other winding will cause variation in the scanning current traversing said horizontal deflection winding;

means for deriving from said vertical output transformer a scanning voltage waveform of a first polarity and inclusive of a retrace pulse component;

means for clipping said scanning voltage waveform, said clipping means having an output terminal and including a diode coupled to said deriving means and poled so as to block said retrace pulse component and pass to said output terminal at least a portion of the remainder of said voltage waveform;

means for deriving from said vertical output transformer a second voltage waveform corresponding to a relatively attenuated, opposite-polarity version of said first-named scanning voltage waveform;

means, including a resistor and a capacitor coupled in series between said last-named deriving means and said clipping means output terminal, for adding an additional voltage component to the voltage waveform portion passed by said diode;

and means for utilizing the composite voltage waveform appearing at said clipping means output terminal to drive said control winding, the current thereby traversing said control winding having a wave shape corresponding to the integral of said composite voltage waveform.

10. In a television receiver comprising a deflection yoke having respective vertical and horizontal deflection windings, a horizontal deflection system including a horizontal output transformer serving as a source of horizontal scanning current for said horizontal deflection winding, and a vertical deflection system including a vertical output tube, having respective anode and cathode circuits, and a vertical output transformer, driven by said anode circuit and serving as a source of vertical scanning current for said vertical deflection winding;

side pincushion correction apparatus comprising the combination of:

a saturable reactor including a control winding and two other windings, the respective impedances of said other windings varying differentially in response to changes in current through said control winding;

means connecting a first of said other windings in series in the path of the scanning current traversing said horizontal deflection winding and connecting the second of said other windings effectively in shunt with said horizontal deflection winding for causing any of said differential variations of the respective impedances of said other windings to produce respective effects on the loading of said horizontal output transformer that are substantially mutually cancelling while producing respective effects on the amplitude of said scanning current traversing said horizontal deflection winding that are mutually reinforcing;

means for deriving from said vertical output transformer a periodic voltage waveform of vertical frequency;

means included in said vertical output tube cathode circuit for developing a stable unidirectional voltage in response to space current in said vertical output tube;

means providing a direct current conductive coupling between said unidirectional voltage developing means and said control winding;

means for adjusting said unidirectional voltage to establish a bias current in said control winding that sets the respective bias point impedances of said other windings to produce a given magnitude of loading on said horizontal output transformer;

and means applying said vertical frequency voltage waveform to said control winding for causing the respective impedances of said other windings to vary from their bias point levels to produce pincushion correcting changes in said horizontal scanning current amplitude without causing substantial departure from said given magnitude of loading on said horizontal output transformer.

References Cited

UNITED STATES PATENTS

| | | | |
|---|---|---|---|
| 2,842,709 | 7/1958 | Lufkin | 315—24 |
| 2,906,919 | 9/1959 | Thor et al. | 315—24 |

DAVID G. REDINBAUGH, *Primary Examiner.*

T. A. GALLAGHER, *Assistant Examiner.*